(12) United States Patent
Soelch

(10) Patent No.: US 6,613,847 B2
(45) Date of Patent: *Sep. 2, 2003

(54) LOW VISCOSITY LIQUID CRYSTALLINE POLYMER COMPOSITIONS

(75) Inventor: Richard Robert Soelch, Essex Junction, VT (US)

(73) Assignee: E. I. du Pont de Nemours, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/930,755

(22) Filed: Aug. 16, 2001

(65) Prior Publication Data

US 2002/0013424 A1 Jan. 31, 2002

Related U.S. Application Data

(62) Division of application No. 09/271,224, filed on Mar. 17, 1999, now Pat. No. 6,294,618.
(60) Provisional application No. 60/081,144, filed on Apr. 9, 1998.

(51) Int. Cl.$^7$ .................. C08L 67/03; C08L 67/04; C08L 77/12
(52) U.S. Cl. .................. 525/434; 525/437; 525/509; 525/519
(58) Field of Search .................. 525/437, 434, 525/509, 519

(56) References Cited

U.S. PATENT DOCUMENTS 4,904,752 A * 2/1990 Kanoe .................. 528/97
5,264,477 A * 11/1993 Wissbrun .................. 524/396

* cited by examiner

*Primary Examiner*—Patricia A. Short

(57) ABSTRACT

A liquid crystalline polyesters or poly(ester-amides) having improved melt viscosity, is made by reacting the polymer with limited amounts of a compound containing specified functionality, such as hydroxyl, carboxyl, or amine. The process may be carried out in a typical polymer melt mixing apparatus such as an extruder. The low viscosity polymer product of the claimed invention has surprising toughness and is particularly useful for encapsulation of electronic components.

10 Claims, No Drawings

LOW VISCOSITY LIQUID CRYSTALLINE POLYMER COMPOSITIONS

CROSS REFERENCE TO RELATED APPLICATIONS

This application is a divisional of U.S. application Ser. No. 09/271,224, filed Mar. 17, 1999, now U.S. Pat. No. 6,294,618 which claims the benefit of U.S. Provisional Application No. 60/081,144, filed Apr. 9, 1998.

BACKGROUND

1. Field of the Invention

The present invention relates to improved melt-flow liquid crystalline polymer compositions (LCPs) with unusually high toughness.

2. Background of the Invention

Liquid crystalline polymer compositions are known in the art by various terms, including "liquid crystal" and "anisotropic melts." LCPs are known to have exceptionally high tensile strength and modulus compared to analogous polymers not having a liquid crystalline character. LCPs are useful in many applications, including molding resins for a variety of electrical parts, and for other uses such as films. While LCPs are known for their ability to flow under difficult molding conditions, in some instances such as for encapsulating electronic components, the melt viscosities of normal molding grade LCPs are too high.

Generally speaking, the melt viscosity of any given LCP is most affected by the polymer molecular weight, the lower the molecular weight the lower the melt viscosity. While low molecular weight LCPs can be synthesized directly by condensation polymerization, this method may have some drawbacks. The polymer produced may have a tendency to increase in molecular weight (MW) during melt processing by continuation of the melt condensation process. At extremely low viscosity levels of 50 Pa*s or less, these LCPs are very brittle. Additionally, the handling of such low molecular weight polymers in processes designed to produce molding grade polymers can be problematical.

European Patent Application 376,615 describes a method of preparing a LCP with a relatively low melt viscosity by mixing 100 parts of a high molecular weight LCP with 1–100 parts, preferably 10–40 parts, of a low molecular weight LCP with MW about 1000 to 7000, preferably between 1000–4000. This method requires production of an unusual low molecular weight LCP using special equipment, since the low molecular weight LCP material is not readily commercially available at a MW range of 1000 to 7000.

U.S. Pat. No. 4,434,262 describes an improved melt processable blend of a major amount of polyester or polyolefin with a low MW liquid crystalline compound preferably below 1000 molecular weight. The liquid crystalline compound does not chemically react with the polyolefin or the polyester component in the melt blend. Melt viscosity reductions of 25% to 75% were obtained by adding 10 parts by weight of the liquid crystalline compound to 90 parts by weight of polyolefin or polyester.

Accordingly, it is an object of this invention to provide a method for improving the melt viscosity or fluidity of an LCP, as well as an LCP resin composition having improved melt-viscosity, or fluidity, that can be efficiently fabricated into an article having a small thickness or an intricate shape at lower processing temperatures, while still maintaining the original strength, rigidity, and elongation characteristics of the parent LCP.

SUMMARY OF THE INVENTION

A composition having improved fluidity and excellent toughness characteristics, comprising: a thermotropic liquid crystalline polymer and about 5 to about 250 milli equivalents of the liquid crystalline polymer, of a functional compound per kilogram whose functionality is selected from the group consisting of hydroxyl, carboxyl, carboxylate, ester, and primary or secondary amine.

The invention also relates to a practical method for the production of a lower melt-viscosity thermotropic liquid crystalline polymer by combining under reaction conditions, the liquid crystalline polymer with a functional compound, at a ratio of about 5 to about 250 milli equivalents of functional compound per kilogram of the liquid crystalline polymer. The functional compound is selected from the group consisting of hydroxyl, carboxyl, carboxylate, ester, and primary or secondary amine.

The present invention further relates to a method for improving the fluidity of a liquid crystalline polymer by combining the liquid crystalline polymer with about 5 to about 200 milli equivalents per kilogram of said liquid crystalline polymer of a functional compound, whose functionality is selected from the group consisting of hydroxyl, carboxyl, carboxylate, ester, and primary or secondary amine, at a temperature sufficient to cause reaction of said functional compound with said liquid crystalline polymer, and for a period of time sufficient to cause at least a 10% lowering of a melt viscosity of said liquid crystalline polymer when measured at a shear rate of 1000 $sec^{-1}$.

DETAILS OF THE INVENTION

LCP Component

Thermotropic liquid crystalline polymers are known in the art by various terms, including "liquid crystal" and "anisotropic melts." Liquid crystalline polymers are prepared from monomers which are generally long, flat, and fairly rigid along the axis of the molecule and have chain extending linkages that are either coaxial or parallel. Whether or not a polymer is in a liquid crystal state can be determined by known procedures for determining optical anisotropy. A polymer is optically anisotropic if, in the melt phase, it transmits light when examined between crossed polarizers utilizing a polarizing microscope. A thermotropic liquid crystalline polymer herein is given its conventional meaning, is an LCP by the TOT test described in U.S. Pat. No. 4,075,262, which is hereby included by reference. The LCP polymers useful herein include polyesters, poly(ester-amides), poly(ester-imide), poly(ester-amide-imide), polyazomethines, or mixtures thereof. Any thermotropic LCP may be used in these compositions and processes.

Preferred thermotropic LCPs are polyesters or poly(ester-amides), and it is especially preferred that the polyester or poly(ester-amide) is partly or fully aromatic. By aromatic polyesters is meant that the carbon atom and oxygen atom, —C(O)O— (bolded in this formula), of the ester linkages, are bonded to carbon atoms which are part of aromatic rings.

Functional Compounds

The functional compounds used herein may be mono-, di-, trifunctional, etc. The functionality for any particular functional compound should preferably be the same functional group if more than one functional group is present. It is also preferred that the functional group is bound directly to a carbon atom of an aromatic ring. More than one functional compound may be used, so long as the total amount of functional compound added is within the range of about 5 to about 250 milli equivalents per kilogram (meq/kg) of LCP. The functional compound may contain other substitutents, so long as these substitutents do not interfere with the process of reducing the LCP viscosity.

Useful functional compounds include hydroquinone, 1-naphthol, bisphenol-A, 1,6-hexanediaminecarbamate, terephthalic acid, trimesic acid, 2,6-naphthalene dicarboxylic acid, 1-napthoic acid, sodium benzoate, dimethyl terephthalate, hudroquinone diacetate, 6-hydroxy-2-napthoic acid, 4-aminophenol, hexamethylenediammonium adipate, 1,4-cyclohexanedicarboxylic acid, cyclohexanoic acid, 1,12-dodecanedicarboxylic acid, 4,4'-biphenol, 1,6-hexanediamine, 4-sulfoisophthalic acid, and isophthalic acid. The preferred functional groups are hydroxyl and amine, with hydroxyl and carboxyl being particularly preferred because they are surprisingly more effective at reducing viscosity on an equivalent basis. The preferred functional compounds are mono-functional or di-functional with di-functional being more preferred. However, if it is desired to also introduce branching or crosslinking into the LCP while lowering its viscosity, tri- or higher functional compounds are used. Preferably, the functional compound has a molecular weight of about 100 to about 300 grams per mole.

Besides the useful functional compounds listed above, compounds that readily generate the appropriate functional groups in the list for reducing the LCP viscosity are also included within the definition of useful groups. For instance, amine carbamates generally readily decompose thermally to their respective amines, and are therefore considered herein as amines.

An important factor in the choice of the functional compound is its volatility. While relatively volatile compounds may be used, it is preferred that the functional compound chosen to be not too volatile, having low vapor pressure at the process conditions. While not fatal to the process of lowering the melt viscosity, any vaporization of a relatively volatile functional compound represents a yield loss and reduces the "practical efficiency" of the functional compound in lowering viscosity in a conventional extruder. If the compound is relatively volatile, precautions should be taken to prevent loss by volatilization or some of the functional compound will be "lost" to the air.

It is preferred that about 25 to about 125 meq/kg of LCP of the functional compound be used. By equivalents herein is meant the number of "moles" of functional group (e.g., hydroxyl, etc.) added to the process or composition.

Other Components

The low-melt viscosity LCP compositions of the present invention may optionally have in them other types of ingredients without detriment to the fluidity or physical properties of the LCP, such as fillers, reinforcing agents, pigments, lubricants, mold releases, antioxidants, and other materials usually found in thermoplastic compositions.

Preparation

In order to reduce the viscosity of the LCP, it is necessary to reasonably uniformly mix the functional compound with the starting LCP. This may be done by melt mixing the LCP and functional compound before or simultaneous with the step of exposing the mixture to temperatures at which reaction occurs between the functional compound and the ester groups of the LCP. This is most conveniently done by carrying out the process in a typical polymer melt mixing apparatus, such as a single or twin screw extruder or a kneader. This type of a process releases few if any emissions to the environment.

The novel composition may be made by simply dry blending particles (such as pellets) of the LCP and powder or liquid of the functional compound in the appropriate relative amounts. The dry blending may be done by tumble blending. The blended mixture may then be fed to an appropriate melt mixer. Alternatively, the polymer, usually in the form of pellets, and the functional compound may be separately metered into the melt mixing apparatus and mixed therein while the polymer (and perhaps the functional compound) is being melted.

In order to carry out the reaction for lowering the melt viscosity, the temperature should be above the melting point of the LCP. This temperature typically ranges from about 200° C. to about 400° C. melt temperature, preferably about 275° C. to about 360° C. Depending on the temperature, the functional compound, and the LCP used, useful reductions in melt viscosity can typically be obtained in about 30 sec to about 10 minutes, preferably about 45 sec to about 3 minutes. This time range is typical of residence times in a polymer melt mixing apparatus.

The ingredients of the claimed composition are usually added by melt mixing in any of the following stages:

1. Adding the ingredients after the viscosity of the LCP is reduced. The melt viscosity reduction of the LCP is measured by comparing the viscosity of the "pure" LCP before and after reaction with the functional compound, and before the ingredients are added.
2. Adding before and in a separate step from the viscosity reduction process. Viscosity reduction is measured based on the composition (including the added ingredients) before and after reaction with the functional compound.
3. Adding in the same operation as the viscosity reduction, i.e., the added ingredients are melt mixed at essentially the same time as the functional compound is mixed in and/or reacts with the polymer. This is preferred in many instances since the viscosity reduction and inclusion of the other ingredients can be accomplished in one step. Viscosity reduction is measured comparing the after viscosity with the before viscosity of a polymer containing the additional ingredients mixed in the same manner, but without the functional compound present.

The LCP composition with lowered viscosity may be pelletized or formed for later use in molding or extruding applications. Alternatively, the composition can be prepared directly in a molding machine to form molded parts.

Measurement of Melt Viscosity

The viscosity of the claimed LCP composition, when measured at a shear rate of 1000 sec$^{-1}$, is lowered at least 10% from the original viscosity as shown below:

Final visc.≦Initial visc.−0.10(Initial visc.)

In most cases, the final viscosity of the LCP is measured to be at least 50% less than the initial viscosity. In certain applications, the LCP composition of the present invention can be processed at temperature levels below that of the starting LCP. For most practical applications, viscosity reduction is preferably at least 50%. In some cases, the final viscosity is reduced by one or two orders of magnitude from the initial viscosity of the starting LCP. At this low viscosity level of about 10 Pa*s or less, the final LCP is a thermoplastic with the low viscosity characteristic of a thermoset and can be used in thermoset applications such as encapsulation and composites.

The final viscosity of the LCP with improved fluidity of the invention is often found to be surprisingly stable in viscosity. Viscosity stability is an important factor in commercial applications since some thermoplastics materials, i.e., sprues and runners, are routinely recycled. It is critical for the viscosity of the sprues and runners to remain stable for a reasonable period of melt processing time (15 minutes or more), allowing them to be mixed in with the virgin materials for recycle processing. Even with an improved fluidity, the final LCPs surprisingly retain the high strength, rigidity, and good elongation characteristics of the parent LCPs.

Melt viscosity of the Examples that follow was determined on a Kayeness rheometer (Kayeness, Inc., RD#3, Box 30, E. Main St., Honeybrook, Pa. 19344 U.S.A.). Generally, the Kayeness rheometer can readily and routinely measure melt viscosities down to about 50 Pa*s and 1000 1/s. However, great care is needed to gauge viscosity below this value of 50 Pa*s.

Melt viscosity of the Examples in Tables I and II was generated using a die having a hole radius of 0.5 mm (0.02") by 2.0 cm (0.80") long using a melt time of 360 sec. Melt viscosity of the Examples in Table III was generated using an experimental die with a die hole radius of 0.20 mm (0.0078") by 3.48 cm (1.2") long. This small diameter die was custom fabricated using commercially available EDM type drills. This small 0.20 mm die gives a more accurate measurement of viscosity under 10 Pa*s than a 0.5 mm radius die and can measure viscosity levels of 0.4 Pa*s with an accuracy of about ±0.1 Pa*s. For both dies, a preheating time of at least five minutes and preferably about thirty minutes is required in between samples (when measuring viscosity on multiple samples) to minimize variability in viscosity values.

At a viscosity level of about 20 Pa*s at 1000 1/s and below, measuring viscosity is quite a challenge due to sample drooling from the die during the hold portions of the measurement test. The drooling can be effectively minimized by manually plugging the orifice during the preheat and in between measurements (multiple measurements are usually made within one Kayeness run).

At a viscosity level of about 10 Pa*s, and especially below about 5 Pa*s, the extremely fluid melt tends to seep in between the Kayeness piston and cylinder. The variability of these measurements may be reduced by making multiple measurements at one shear rate until a steady state viscosity is reached (indicating that no more melt is seeping between the piston and cylinder walls).

EXAMPLES

For the examples listed in Tables I and Table II, including the comparable Example A, the LCP polymer has a composition of hydroquinone/4,4'-biphenol/terephthalic acid/2,6-naphthalene dicarboxylic acid/4-hydroxybenzoic acid/6-hydroxy-2-napthoic acid in the molar ratios 50/50/70/30/270/50. The LCP polymer has a melting point of 231° C. as determined by ASTM D3414-82 at a heating rate of 25° C./min, and a heat deflection temperature (HDT) of 120° C. as measured by ASTM D648 at 1.8 MPa. The LCP polymer can be made by methods readily available or well-known to those skilled in the art, for example, with the acetate ester of the hydroxyl group being condensed with the carboyclic acids in the monomers.

For Table III, the LCP polymer has a composition of hydroquinone/4,4'-biphenol/terephthalic acid/2,6-napthalenedicarboxylic acid/4-hydroxybenzoic acid in the molar ratio of 50/50/70/30/320. This polymer may be prepared from the appropriate monomers by standard poly-condensation techniques well-known to those skilled in the art. When the polymerization appears nearly complete as indicated by the amount of by-product collected in this poly-condensation process, the molten mass is placed under vacuum and heated to a higher temperature to complete the polymerization and remove the remaining by-product.

The pre-polymer in Table III is a lower molecular weight version of the same composition as the LCP polymer and prepared essentially the same way, except that the polymerization process was cut short. The ingredients (967.6 grams) were combined with 765.3 mils of acetic anhydride and refluxed for 40 minutes at 170° C. Acetic acid was removed over the next three hours while the temperature was increased to 325° C. At this point, vacuum was applied gradually over the next 50 minutes to 50 mm and further to 1 mm after 20 more minutes, then held constant for an additional 85 minutes. The resulting brittle product is the pre-polymer in Table III.

The functional compounds used in the Examples are: terephthalic acid, 2,6-napthalenedicarboxylic acid, dimethyl terephthalate, hydroquinone, hydroquinone diacetate, trimesic acid, 1-napthoic acid, 2,6-dihydroxynaphthalene, 1-napthol, bisphenol A, 6-hydroxy-2-napthoic acid, and 4,4'-biphenol are all commercially and readily available from various places including laboratory supply houses. Hexamethylene diammonium adipate is available from Rhone-Poulenc or BASF. Hexamethylene diamine carbamate (Diak® #1) is available from DuPont-Dow Elastomers, Wilmington, Del., U.S.A.

The LCP, in pellet form, was dry blended with the functionalized compound and then fed to the back of a Werner & Pfleiderer 28 mm twin screw extruder. The extruder was run with the barrels operated at 200–300 rpm, and set to 290° C. for the Examples in Tables I and II and 340° C. for the Examples in Table III.

The strand exiting the extruder was water quenched and cut into pellets. The pellets were vacuum-dried overnight (600–1200 Pa, absolute, with a nitrogen bleed) at 80–100° C. In the cases where very low melt viscosity compositions were prepared, it was advantageous to use a 45° die on the extruder which angled the strand downward into the water quench bath and effectively prevented the melt from sticking to the die face.

Dried pellets were injection molded on a 171 g (6 oz.) HPM injection molding machine (HPM Corp. 200-TP 6.5—6.5 oz. Injection Molding Machine) from HPM Corp., at 820 Marion Rd., Gilead, Ohio 43338, U.S.A. The machine was equipped with a general purpose type screw. Barrel and nozzle temperatures were typically set at 290° C. for the compositions and molds were water heated to 80–90° C.

Tensile strength and elongation was measured on 3.2 mm (⅛") thick tensile bars with a cross-head speed of 0.51 cm (0.2")/min according to ASTM D638-91. Strain gauges were used to accurately determine elongation.

Flexural modulus was measured on 1.6 mm (1/16") thick flexural bars according to ASTM D790-92.

The functional compounds used, and the results or the viscosity stability tests are shown in Table I with the final viscosity of the LCP with improved fluidity found to be surprisingly stable.

TABLE I

| Example | Functional Compound Name | meq/k | Visc. (Pa*s) at 300° C. 100 1/s | Visc. (Pa*s) at 300° C. 1000 1/s | Visc. (Pa*s) at 300° C., 500 s⁻¹ over time in minutes |||||
|---|---|---|---|---|---|---|---|---|---|
| | | | | | 6.2 | 9.3 | 12.9 | 16.5 | 20.1 |
| Compare A | NONE USED | — | 212 | 66 | 97 | 95 | 106 | 104 | 106 |
| 14 | 6-hydroxy-2-napthoic acid | 50 | 35 | 15 | — | — | 20.2 | 19 | 19 |

TABLE I-continued

|  |  | Functional Compound | | Visc. (Pa*s) at 300° C. | | Visc. (Pa*s) at 300° C., 500 s⁻¹ | | | | |
|---|---|---|---|---|---|---|---|---|---|---|
| Example | Name | | meq/k | 100 1/s | 1000 1/s | over time in minutes | | | | |
| | | | | | | 6.2 | 9.3 | 12.9 | 16.5 | 20.1 |
| 16 | Hydroquinone plus terephthalic acid | | 25 | 90 | 39 | 53 | 34 | 54 | 47 | 47 |

The functional compounds used, and the results of the viscosity and property tests are shown in Table II showing the final viscosity of the LCP being at least 50% less than the initial viscosity in most cases.

TABLE II

| Example | Functional Compound Name | meq/ kg | Tensile Strength MPa | Tensile Elong % | Flexural Modulus GPa | Viscosity, 300° C., Pa*s | |
|---|---|---|---|---|---|---|---|
| | | | | | | 100 sec⁻¹ | 1000 sec⁻¹ |
| Comp. A | None | — | 153 | 2.8 | 9.6 | 212 | 66 |
| 1 | Hydroquinone | 50 | 139 | 2.0 | 9.7 | 78 | 36 |
| 2 | Hydroquinone | 100 | 123 | 2.3 | 10.2 | 17 | 4ᵇ |
| 3 | Hydroquinone | 200ᵃ | 106 | 3.5 | 8.5 | 5ᵇ | 2ᵇ |
| 4 | 1-naphthol | 100 | 138 | 2.1 | 9.6 | 9 | 6 |
| 5 | Bisphenol-A | 100 | 143 | 2.0 | 9.1 | 63 | 18 |
| 6 | Diak ® #1 | 50 | 131 | 1.9 | 9.1 | 22 | 14 |
| 7 | Terephthalic acid | 100 | 132 | 1.9 | 9.2 | 89 | 43 |
| 8 | Trimesic acid | 66.7 | 148 | 2.5 | 9.4 | 130 | 38 |
| 9 | 2,6-naphthalene dicarboxylic acid | 100 | 145 | 3.0 | 9.4 | 94 | 44 |
| 10 | 1-napthoic acid | 100 | 141 | 1.9 | 9.7 | 50 | 24 |
| 11 | sodium benzoate | 50 | — | — | — | 85 | 37 |
| 12 | Dimethyl terephthalate | 100 | 143 | 2.2 | 10.3 | 97 | 42 |
| 13 | Hydroquinone diacetate | 100 | 143 | 2.0 | 10.1 | 61 | 18 |
| 14 | 6-hydroxy-2-napthoic acid | 50 | 131 | 1.7 | 9.7 | 35 | 15 |
| 15 | 4-aminophenol | 50 | 119 | 2.0 | 9.6 | 54 | 30 |
| 16 | Hydroquinone plus terephthalic acid | 25 | 131 | 2.1 | 9.9 | 90 | 39 |
| 17 | Hexamethylene diammonium adipate | 50 | — | — | — | 24 | 19 |

ᵃA white, apparently crystalline substance (presumably hydroquinone) sub-limed from the extruder vacuum port. Thus it appears likely that the actual amount of hydroquinone in the product was somewhat less than 200 meq/kg.
ᵇVery low viscosity. A value below 5 Pa*s is simply an indicator of very low viscosity.

Table III compares properties of a starting LCP with a pre-polymer and the LCP of the present invention, showing the surprising combination of toughness and low melt-viscosity characteristics of the novel LCP composition of the present invention. The LCP is surprisingly tough compared with a directly polymerized pre-polymer as evidenced by the easy strand formation upon extrusion, in spite of the fact that the melt viscosities of the two materials are quite similar. The strands of the final LCP were easily extruded and cut into pellets while the pre-polymer had to be handled on a belt and shattered upon cutting.

Additionally, the pre-polymer was very brittle and readily cryogenically ground to a fine powder with a hammer mill using liquid nitrogen, whereas the LCP of the present invention formed a fibrous material that continued to expand upon continuous grinding. This characteristic is reflected in the bulk density of the ground products of the pre-polymer and the LCP composition plus a functional compound group. The low density of the LCP composition as shown in the Table is indicative of its fibrous nature. Photographs comparing the ground products under 50× magnification verified the feathery, fibrous nature of the LCP composition of the present invention which contrasted sharply with the essentially particulate ground pre-polymer composition

TABLE III

| Example | Type Used | Functional Compound meq/kg | Extruded Strand Toughness | Ground Bulk Density g/cc | Melt Visc 1000 sec⁻¹ Pa*s | |
|---|---|---|---|---|---|---|
| | | | | | 320° C. | 300° C. |
| Compare 18 | LCP | — | Tough | — | 64 | No Flow |

TABLE III-continued

| Example | Type Used | Functional Compound meq/kg | Extruded Strand Toughness | Ground Bulk Density g/cc | Melt Visc 1000 sec$^{-1}$ Pa*s 320° C. | Melt Visc 1000 sec$^{-1}$ Pa*s 300° C. |
|---|---|---|---|---|---|---|
| Compare 19 | Prepolymer | — | Brittle | 0.406 | ~1 | 7 |
| 20 | LCP + 4,4'-biphenol | 215 | Tough | 0.111 | ~1 | 6 |

As is apparent from the foregoing description, the materials prepared and procedures followed relate only to specific embodiments of the broad invention. While forms of the invention have been illustrated and described, modifications can be made without departing from the spirit and scope of the invention. Accordingly, it is not intended that the invention be limited thereby.

What is claimed is:

1. A composition comprising:
   a. a liquid crystalline polymer;
   b. a difunctional compound whose functionality is selected from the group consisting of hydroxyl, carboxyl, ester, and primary or secondary amine;
   said difunctional compound being from about 5 to about 250 milli equivalents per kg by weight of said liquid crystalline polymer.

2. The composition of claim 1, wherein said polymer is a liquid crystalline polyester.

3. The composition of claim 1, wherein a functional group in said difunctional compound is hydroxyl.

4. The composition of claim 1, wherein a functional group in said difunctional compound is carboxyl.

5. The composition of claim 1, wherein said difunctional compound is about 25 to about 100 milli equivalents per kg by weight of said liquid crystalline polymer.

6. The composition of claim 1, which is capable of undergoing melt-processing at a temperature sufficient to cause reaction of said difunctional compound with said liquid crystalline polymer and for a sufficient period of time to cause at least a 10% lowering of viscosity of said liquid crystalline polymer when measured at a shear rate of 1000 sec$^{-1}$.

7. The composition of claim 6, which is capable of undergoing melt-processing at a temperature below 250° C.

8. The composition of claim 6, which has an ultimate tensile strength of at least 90 MPa and an elongation value in excess of 1%.

9. The composition of claim 1, wherein:
   a. said difunctional compound is a hydroxyl or a carboxyl at about 25 to about 100 milli equivalents per kg by weight of said liquid crystalline polymer, and
   b. said blend is melt-processable at a temperature between 200° C. to about 400° C., for period of time of about 30 seconds to about 10 minutes, causing reaction of said difunctional compound with said liquid crystalline polymer to cause at least 10% lowering of the viscosity of said liquid crystalline polymer when measured at a shear rate of 1000 sec$^{31\ 1}$.

10. A molded article fabricated from the composition of claim 1.

* * * * *